(12) United States Patent
Yamada et al.

(10) Patent No.: US 8,225,893 B2
(45) Date of Patent: Jul. 24, 2012

(54) CONTROL APPARATUS AND CONTROL METHOD FOR HYBRID VEHICLE

(75) Inventors: Kenji Yamada, Toyota (JP); Takeshi Itoh, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 473 days.

(21) Appl. No.: 12/449,741

(22) PCT Filed: Feb. 29, 2008

(86) PCT No.: PCT/JP2008/054112
§ 371 (c)(1),
(2), (4) Date: Aug. 25, 2009

(87) PCT Pub. No.: WO2008/126531
PCT Pub. Date: Oct. 23, 2008

(65) Prior Publication Data
US 2010/0051367 A1 Mar. 4, 2010

(30) Foreign Application Priority Data
Mar. 30, 2007 (JP) .................................. 2007-093187

(51) Int. Cl.
*B60W 10/04* (2006.01)
*B60W 10/24* (2006.01)
(52) U.S. Cl. ........... 180/65.285; 180/65.29; 180/65.275; 180/65.265
(58) Field of Classification Search .............. 180/65.21, 180/65.22, 65.225, 65.23, 65.24, 65.265, 180/65.275, 65.28, 65.285, 65.29
See application file for complete search history.

(56) References Cited

U.S. PATENT DOCUMENTS

| 6,232,744 | B1 * | 5/2001 | Kawai et al. ................... 320/132 |
| 6,522,024 | B1 * | 2/2003 | Takaoka et al. ............. 290/40 C |
| 7,099,756 | B2 * | 8/2006 | Sato ................................ 701/22 |
| 2004/0006414 | A1 * | 1/2004 | Suzuki ............................ 701/22 |
| 2004/0123836 | A1 * | 7/2004 | Nishigaki et al. ............. 123/350 |
| 2006/0076914 | A1 | 4/2006 | Yaguchi |
| 2006/0108162 | A1 * | 5/2006 | Tabata et al. ................. 180/65.2 |
| 2008/0000700 | A1 * | 1/2008 | Kotani ......................... 180/65.2 |
| 2008/0053721 | A1 * | 3/2008 | Hoshiba et al. .............. 180/65.2 |

FOREIGN PATENT DOCUMENTS

| JP | A 10-238380 | 9/1998 |
| JP | A 2002-213592 | 7/2002 |
| JP | A 2003-49684 | 2/2003 |
| JP | 2006050773 A * | 2/2006 |
| JP | A 2006-136184 | 5/2006 |
| JP | A 2006-219118 | 8/2006 |
| JP | A 2006-320039 | 11/2006 |
| JP | A 2007-20383 | 1/2007 |
| JP | A 2007-55287 | 3/2007 |
| JP | A 2007-166875 | 6/2007 |

* cited by examiner

Primary Examiner — John R Olszewski
(74) Attorney, Agent, or Firm — Oliff & Berridge, PLC (57) ABSTRACT

The application is directed to solving the problem of generation of overdischarging from a power storage device according to compensation for reduction in electrical power generated by a first motor generator (MG1) corresponding to reduction in the revolution speed of the MG1. When detection is made of reduction in the revolution speed of the MG1 corresponding to reduction in the engine speed, any of the four following operations is carried out: (1) modifying the output torque of the MG1 such that electrical power generated by the MG1 increases; (2) modifying the output torque of a second motor generator (MG2) such that power consumption by the MG2 is reduced; (3) forcing the control mode of the MG1 to be changed to PWM control from one-pulse switching control; and (4) reducing the DC voltage command value for the converter.

14 Claims, 9 Drawing Sheets

| CONTROL MODE | SINE WAVE PWM | OVERMODULATION PWM | ONE-PULSE SWITCHING WAVE |
|---|---|---|---|
| | PWM CONTROL MODE | | ONE-PULSE SWITCHING CONTROL MODE |
| INVERTER OUTPUT VOLTAGE WAVEFORM | FUNDAMENTAL WAVE COMPONENT  | FUNDAMENTAL WAVE COMPONENT  | FUNDAMENTAL WAVE COMPONENT  |
| MODULATION RATE | 0 TO APPROXIMATELY 0.61 | APPROXIMATELY 0.61 TO 0.78 | 0.78 |
| FEATURE | TORQUE VARIATION SMALL | OUTPUT IMPROVED IN MIDDLE SPEED RANGE | OUTPUT IMPROVED IN HIGH SPEED RANGE |

CONTROL APPARATUS AND CONTROL METHOD FOR HYBRID VEHICLE

TECHNICAL FIELD

The present invention relates to a control apparatus and control method for a hybrid vehicle. More particularly, the present invention relates to control for a hybrid vehicle including an engine, and a motor generator connected to the engine via a power split device.

BACKGROUND ART

There is conventionally proposed a hybrid vehicle incorporating an engine and first and second rotating electric machines (motor generator). For example, Japanese Patent Laying-Open No. 10-238380 discloses a hybrid vehicle incorporating an engine, a first rotating electric machine (motor generator), connected to the engine to determine the engine speed, and a second rotating electric machine (motor generator) to determine the driving force of the vehicle.

Particularly, Japanese Patent Laying-Open No. 10-238380 discloses a control apparatus for improving the engine response by setting appropriately the torque command value of the first and second motor generators during transient driving in which the vehicle is increased or decreased in speed. For example, there is disclosed an operation of correcting the torque command value for the first motor generator towards the increasing side and the torque command value for the second motor generator towards the decreasing side during a vehicle speed reducing mode such as an engine fuel cut mode.

Further, Japanese Patent Laying-Open No. 2006-320039 discloses a control configuration of improving the controllability of the motor current in a motor drive system by modifying the motor applied voltage according to the changing ratio of the motor revolution speed when the speed of the AC motor that is the subject of control rapidly changes.

In a hybrid vehicle based on a configuration as disclosed in Japanese Patent Laying-Open No. 10-238380, the operating state of the first motor generator is controlled such that the engine speed is maintained at the high efficiency region to improve the fuel consumption. Therefore, when engine control to reduce the engine output by fuel cut or the like is executed under the state where the output torque is regulated such that increase in the speed of the first motor generator is suppressed, there is the possibility of the revolution speed of the first motor generator dropping rapidly in accordance with the engine inertia when the engine speed is reduced. Particularly, such a problem is apt to occur readily in a hybrid vehicle of a high power output since the engine inertia increases corresponding to a higher engine power.

In a hybrid vehicle, power balance is established such that any insufficiency or excess in the total power of the first and second motor generators (sum of power consumption and/or generated power) is covered by the input/output power of the power storage device such as a battery. It is therefore necessary to control the power balance such that the aforementioned total power is within a predetermined range in order to prevent overcharging and overdischarging at the power storage device as well as to avoid generation of overcurrent at the power converter (inverter, converter, and the like) disposed between the power storage device and the first and second motor generators.

However, if the revolution speed of the first motor generator rapidly drops by the problem set forth above, the rapid reduction in the electrical power generated by the first motor generator cannot be compensated for and the power balance will be disturbed, leading to the possibility of causing overdischarging from the power storage device.

DISCLOSURE OF THE INVENTION

The present invention is directed to solving the problem set forth above. An object of the present invention is to prevent overdischarging at the power storage device and/or overcurrent caused by disturbance in power balance in a hybrid vehicle including an engine and a motor generator connected to the engine via a power split device even under circumstances where the revolution speed of the motor generator changes upon influence of engine control.

The present invention is directed to a control apparatus for a hybrid vehicle. The hybrid vehicle includes an engine, first and second motor generators, a power split device, a power storage device, and a power conversion unit. The engine operates by fuel combustion. The power split device connects, in a relatively rotatable manner with respect to each other, a plurality of rotation elements coupled to an output shaft of the engine, to an output shaft of the first motor generator, and to an output member, and provides at least a portion of the output from the engine to the output member in accordance with input and output of the electrical power and mechanical power by the first motor generator. The second motor generator applies mechanical power in a path from the output member to the driving wheel. The power conversion unit is connected to the power storage device and the first and second generators to carry out power conversion bidirectionally. The control apparatus includes a revolution speed detection unit, a revolution speed reduction detection unit, and a power balance control unit. The revolution speed detection unit detects the revolution speed of the first motor generator. The revolution speed reduction detection unit detects reduction in the revolution speed of the first motor generator corresponding to reduction in the output torque of the engine based on the detected revolution speed of the first motor generator and a control signal of the engine. The power balance control unit controls the power conversion unit such that the sum of the input and output electrical power of the first and second motor generators is restricted to be within a predetermined range when reduction in the revolution speed of the first motor generator is detected by the revolution speed reduction detection unit.

According to another aspect of the present invention, a control method for a hybrid vehicle configured as set forth above includes the steps of: detecting a revolution speed of the first motor generator, detecting reduction in the revolution speed of the first motor generator corresponding to reduction in the output torque of the engine based on the detected revolution speed of the first motor generator and engine control signal, and controlling the power conversion unit such that the sum of the input and output electrical power of the first and second motor generators is restricted to be within a predetermined range when reduction in the revolution speed of the first motor generator is detected at the step of detecting the revolution speed.

Preferably, the power split device is configured to include a planetary gear mechanism having a carrier coupled to the output shaft of the engine, a ring gear coupled to the output member, and a sun gear coupled to the output shaft of the first motor generator, as the plurality of rotation elements.

According to the control apparatus or control method for a hybrid vehicle set forth above, the power conversion unit can be controlled such that the sum of the electrical power of the first and second motor generators is restricted to be within a predetermined range when the revolution speed of the first motor generator is reduced by more than a predetermined level due to reduction in the output torque of the engine. Therefore, overdischarging at the power storage device and/or overcurrent caused by disturbance in the power balance at the motor generators altogether can be prevented even under circumstances where the revolution speed of the first motor generator is reduced upon influence of engine control.

Preferably, the power balance control unit modifies the absolute value of output torque of the first motor generator such that the electrical power generated by the first motor generator increases when reduction in the revolution speed of the first motor generator is detected by the revolution speed reduction detection unit. Alternatively, the control step set forth above includes the step of modifying the absolute value of output torque of the second motor generator such that the electrical power generated by the second motor generator is increased when reduction in the revolution speed of the first motor generator is detected in the step of detecting reduction in the revolution speed.

Therefore, in the case where the revolution speed of the first motor generator is reduced by more than a predetermined level, modifying the output torque such that the electrical power generated by the first motor generator is increased allows the disturbance in the power balance at the motor generators altogether caused by rapid reduction in the electrical power generated by the first motor generator to be alleviated.

Alternatively, the power balance control unit preferably modifies the absolute value of output torque of the second motor generator such that power consumption by the second motor generator is reduced when reduction in the revolution speed of the first motor generator is detected by the revolution speed reduction detection unit. Alternatively, the control step set forth above includes the step of modifying the absolute value of output torque from the second motor generator such that power consumption by the second motor generator is reduced when reduction in the revolution speed of the first motor generator is detected by the step of detecting reduction in the revolution speed.

Thus, in the case where the revolution speed of the first motor generator is reduced by more than a predetermined level, modifying the output torque such that power consumption by the second motor generator is reduced allows disturbance in the power balance at the motor generators altogether to be alleviated even if the electrical power generated by the first motor generator is reduced.

Preferably, the power storage device is configured to input and output DC voltage. The power conversion unit is configured to include first and second inverters provided between the power storage device and the first and second motor generators, respectively. Each of the first and second inverters has selectively applied a first control mode in which switching is controlled to apply a one-pulse switching wave voltage to a corresponding motor generator of the first and second motor generators and a second control mode in which the applied voltage to the corresponding motor generator is controlled according to pulse width modulation control. The power balance control unit forces the control mode of the first motor generator to be set at the second control mode when reduction in the revolution speed of the first motor generator is detected by the revolution speed reduction detection unit. Alternatively, the control step set forth above includes the step of forcing the control mode of the first motor generator to be set at the second control mode when reduction in the revolution speed of the first motor generator is detected at the step of detecting reduction in the revolution speed.

Accordingly, when the revolution speed of the first motor generator is reduced by more than a predetermined level, the first motor generator can be forced to be controlled in the second control mode (pulse width modulation control) of high control response. Thus, reduction in the revolution speed of the first motor generator upon influence of engine control caused by application of the first control mode in which the control response is relatively low (one-pulse switching control mode) can be suppressed to alleviate disturbance in the power balance at the motor generators altogether.

Alternatively, the power storage device is preferably configured to input and output DC voltage. The power conversion unit includes a converter provided between the power storage device and a DC power supply line, configured to be capable of boosting the output voltage of DC voltage and outputting the boosted voltage to the DC power supply line, and first and second inverters connected between the DC power supply line and the first and second motor generators, respectively, to carry out power conversion bidirectionally. The power balance control unit reduces the output voltage command value onto the DC power supply line for the converter lower than the current value when reduction in the revolution speed of the first motor generator is detected by the revolution speed reduction detection unit. Alternatively, the control step set forth above includes the step of reducing the output voltage command value onto the DC power supply line for the converter lower than the current value when reduction in the revolution speed of the first motor generator is detected at the step of detecting reduction in the revolution speed.

More preferably, the power balance control unit corrects the torque command value of the second motor generator, corresponding to the reduced amount of the output voltage command value, such that power consumption by the second motor generator is reduced corresponding to the reduced amount of electrical power generated by the first motor generator. Alternatively, the control method further includes the step of correcting the torque command value of the second motor generator, corresponding to the reduced amount of the output voltage command value by the control step, such that power consumption by the second motor generator is reduced corresponding to the reduced amount of electrical power generated by the first motor generator.

Therefore, by reducing the input DC voltage towards first and second inverters that control the first and second motor generators, the electrical power involved in the first and second motor generators is reduced, allowing disturbance in the power balance at the motor generators altogether to be alleviated.

A main advantage of the present invention is to prevent overdischarging at the power storage device and/or overcurrent caused by disturbance in the power balance in a hybrid vehicle including an engine and a motor generator connected to the engine via a power split device, even under circumstances where the revolution speed of the motor generator changes upon influence of engine control.

BEST MODES FOR CARRYING OUT THE INVENTION

Embodiments of the present invention will be described hereinafter in detail. In the drawings, the same or corresponding elements have the same reference characters allotted, and description thereof will not be generally repeated.

(Configuration of Hybrid Vehicle)

Figure 1:
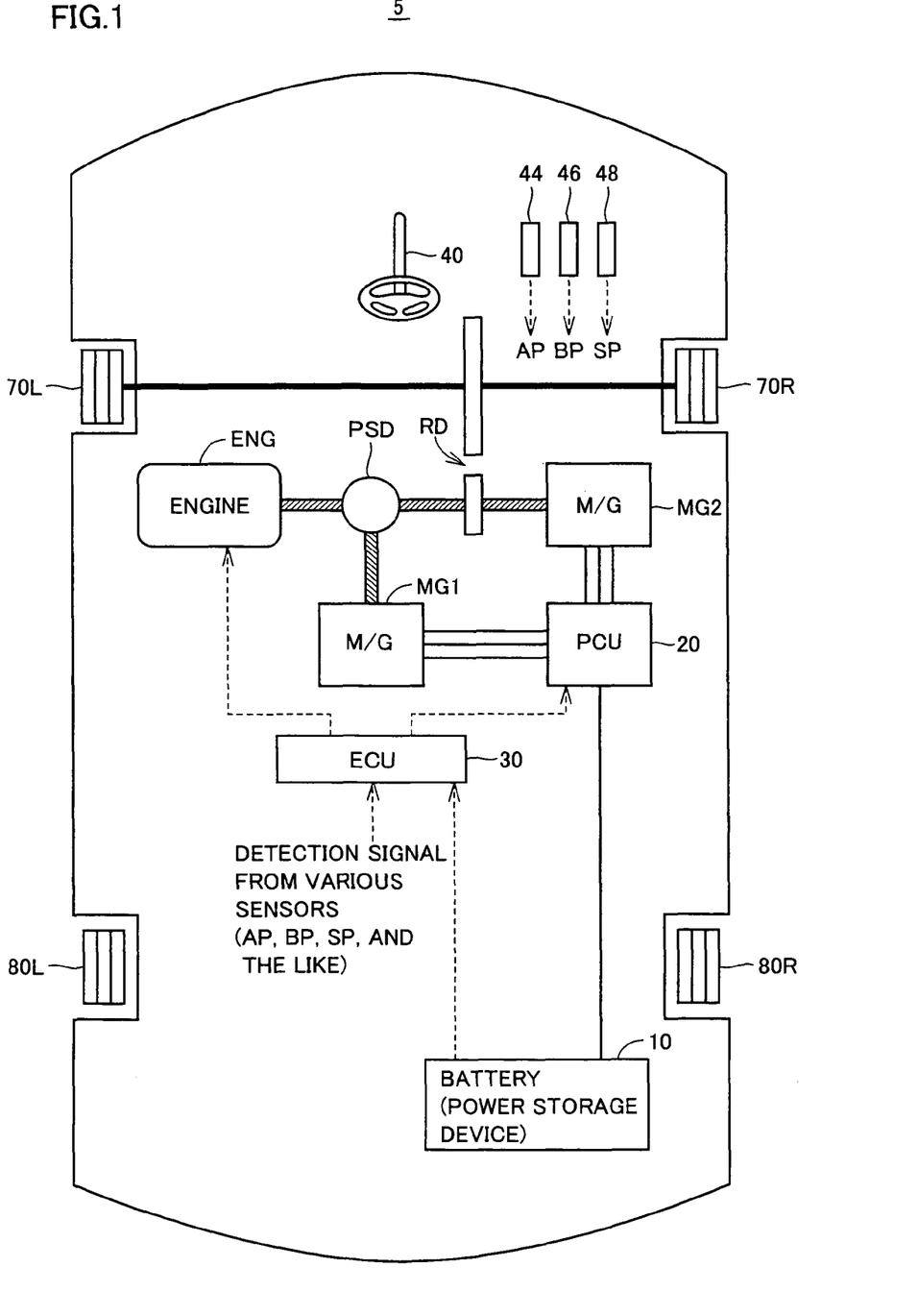
FIG. 1 is a schematic block diagram representing an entire configuration of a hybrid vehicle in which a control apparatus of the present invention is incorporated.

FIG. 1 is a schematic block diagram representing an entire configuration of a hybrid vehicle in which a control apparatus of the present invention is incorporated.

Referring to FIG. 1, a hybrid vehicle 5 includes an engine ENG, motor generators MG1 and MG2, a battery 10, a power conversion unit (PCU: Power Control Unit) 20, a power split device PSD, a reduction gear RD, front wheels 70L and 70R, rear wheels 80L and 80R, and an electronic control unit (ECU) 30. The control apparatus according to the present embodiment is realized by a program executed by ECU 30, for example. Although FIG. 1 represents hybrid vehicle 5 with front wheels 70L and 70R as driving wheels, rear wheels 80L and 80R may be employed as driving wheels instead of front wheels 70L and 70R. Alternatively, a motor generator for driving rear wheels 80L and 80R may be further provided in addition to the configuration of FIG. 1 to establish a 4WD configuration.

The driving power generated by engine ENG is split into two paths by power split device PSD. One path corresponds to driving front wheels 70L and 70R via reduction gear RD. The other path corresponds to driving motor generator MG1 for power generation.

Motor generator MG1 is typically formed of a three-phase AC synchronous electric power generator. Motor generator MG1 generates power as a power generator according to the power of engine ENG split by power split device PSD. The electrical power generated by motor generator MG1 is selectively used according to the vehicle driving state and the SOC (State of Charge) of battery 10. For example, when in a normal cruising mode or a rapid acceleration mode, the electrical power generated by motor generator MG1 is directly used as the power to drive motor generator MG2 as a motor. In the case where the SOC of battery 10 is lower than a predetermined value, the electrical power generated by motor generator MG1 is converted from AC power to DC power by power conversion unit 20 to be stored at battery 10.

Motor generator MG1 is also used as a starter to start engine ENG. When engine ENG is to be started, motor generator MG1 receives power supply from battery 10 to be driven as an electric motor. Motor generator MG1 cranks engine ENG up to start.

Motor generator MG2 is typically formed of a three-phase AC synchronous electric motor generator. In the case where motor generator MG2 is driven as an electric motor, the drive is effected by at least one of the electrical power stored at battery 10 and the electrical power generated by motor generator MG1. The driving force of motor generator MG2 is transmitted to front wheels 70L and 70R via reduction gear RD. Accordingly, motor generator MG2 functions to drive the vehicle by assisting engine ENG, or to drive the vehicle by its own driving force alone.

In a vehicle regenerative braking mode, motor generator MG2 is driven by front wheel 70L and 70R via reduction gear RD to operate as a power generator. Accordingly, motor generator MG2 functions as a regenerative brake that converts the braking energy into electrical energy. The electrical power generated by motor generator MG2 is stored at battery 10 via power conversion unit 20.

Battery 10 is formed of a secondary battery such as of nickel-metal hydride or lithium ion. In the present embodiment, battery 10 is a typical example of "power storage device". In other words, another power storage device such as an electric double layer capacitor may be employed instead of battery 10. Battery 10 supplies DC voltage to power conversion unit 20, and is also charged with DC voltage from power conversion unit 20.

Power conversion unit 20 carries out power conversion bidirectionally between the DC power supplied by battery 10 and the AC power for the drive-control of motor or the AC power generated by the generator.

Hybrid vehicle 5 further includes a steering wheel 40, an accelerator position sensor 44 detecting an accelerator pedal position AP, a brake pedal position sensor 46 detecting a brake pedal position BP, and a shift position sensor 48 detecting a shift position SP.

ECU 30 is electrically connected to engine ENG, power conversion unit 20, and battery 10. ECU 30 integrally controls the operation state of engine ENG, the driving state of motor generators MG1 and MG2, and the state of charge of battery 10 based on a detection signal from various sensors.

Figure 2:
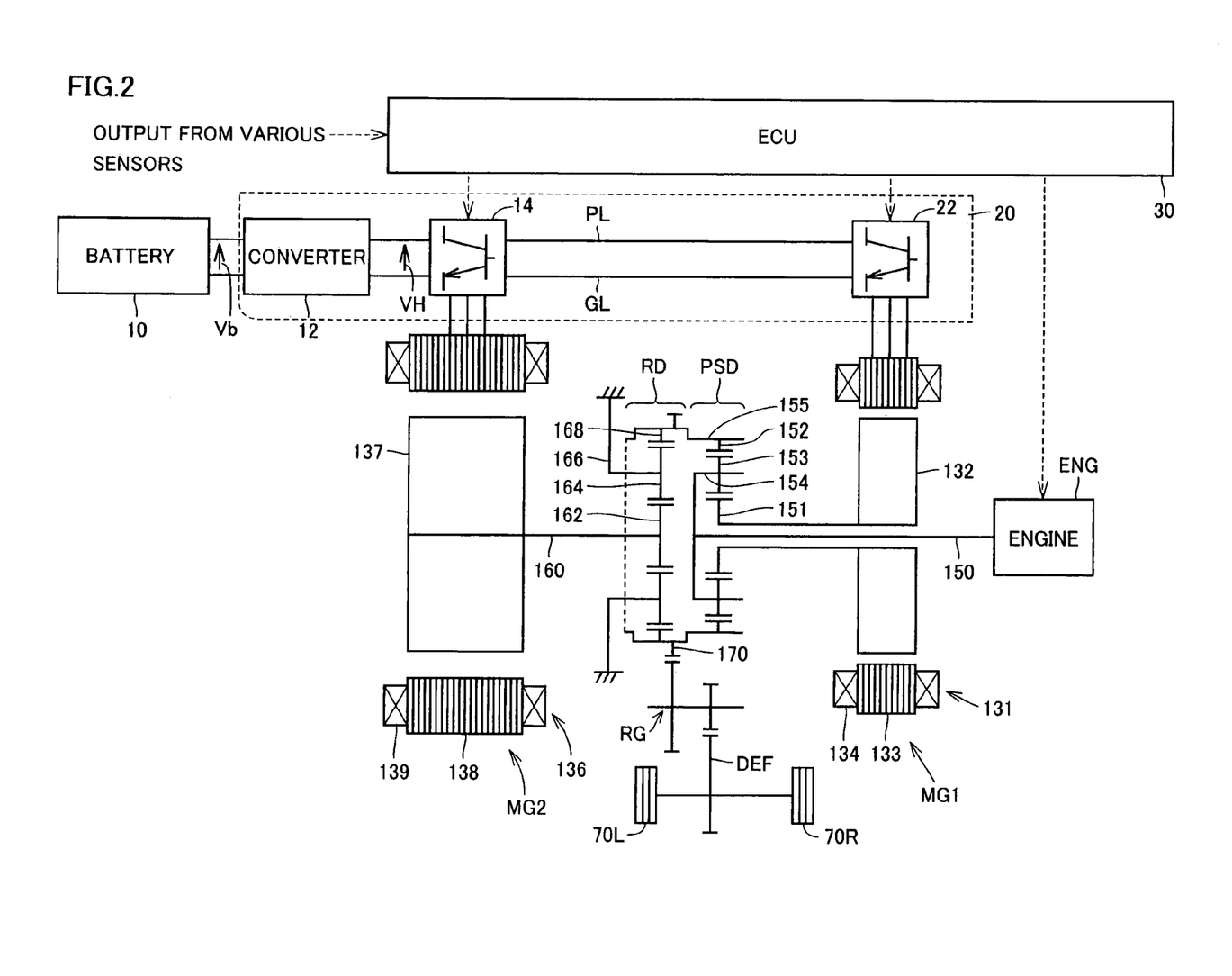
FIG. 2 is a schematic diagram to describe the details of a powertrain of the hybrid vehicle of FIG. 1.

FIG. 2 is a schematic diagram to describe the details of a powertrain in hybrid vehicle 5 of FIG. 1.

Referring to FIG. 2, the powertrain (hybrid system) of hybrid vehicle 5 includes motor generator MG2; reduction gear RD connected to an output shaft 160 of motor generator MG2, engine ENG, motor generator MG1, and power split device PSD.

Power split device PSD is formed of a planetary gear mechanism in the example of FIG. 2, and includes a sun gear 151 coupled to a hollow sun gear shaft through which a crankshaft 150 coaxially extends, a ring gear 152 supported rotatably on the same axis as crankshaft 150, a pinion gear 153 disposed between sun gear 151 and ring gear 152, taking an orbital motion about sun gear 151 while turning on its axis, and a planetary carrier 154 coupled to an end of crankshaft 150, supporting the rotational shaft of each pinion gear 153.

Power split device PSD employs three power input/output shafts, i.e. the sun gear shaft coupled to sun gear 151, ring carrier case 155 coupled to ring gear 152, and crankshaft 150 coupled to planetary carrier 154. When the motive power input/output to any two of these three shafts is determined, the motive power input/output with respect to the remaining one shaft will be determined based on the motive power input/output to the other two shafts.

A counter drive gear 170 for taking out motive power is located outside ring gear case 155, rotating integrally with ring gear 152. Counter drive gear 170 is connected to power transfer reduction gear RG. Ring gear case 155 corresponds to "output member" in the present invention. Thus, power split device PSD operates to provide at least a portion of the output from engine ENG to the output member in accordance with input and output of the electrical power and mechanical power by motor generator MG1.

In addition, the mechanical power is conveyed between counter drive gear 170 and power transfer reduction gear RG. Power transfer reduction gear RG drives a differential gear DEF connected to front wheels 70L and 70R that are driving wheels. Further, on a downward slope or the like, the rotation of the driving wheels is conveyed to differential gear DEF. Power transfer reduction gear RG is driven by differential gear DEF.

Motor generator MG1 includes a stator 131 establishing a rotating magnetic field, and a rotor 132 located in stator 131, having a plurality of permanent magnets embedded. Stator 131 includes a stator core 133, and a three-phase coil 134 wound around stator core 133. Rotor 132 is coupled to the sun gear shaft that rotates integrally with sun gear 151 of power split device PSD. Stator core 133 is formed having a plurality of thin electromagnetic steel plates stacked, affixed to a case not shown.

Motor generator MG1 operates as an electric motor rotatably driving rotor 132 by the interaction between the magnetic field caused by the permanent magnets embedded in rotor 132 and the magnetic field established by three-phase coil 134. Motor generator MG1 also operates as a power generator generating an electromotive force across three-phase coil 134 by the interaction between the magnetic field caused by the permanent magnets and the rotation of rotor 132.

Motor generator MG2 includes a stator 136 establishing a rotating magnetic field, and a rotor 137 located in stator 136, having a plurality of permanent magnets embedded. Stator 136 includes a stator core 138, and a three-phase coil 139 wound around stator core 138.

Rotor 137 is coupled via reduction gear RD to ring gear case 155 that rotates integrally with ring gear 152 of power split device PSD. Stator core 138 is formed having a plurality of thin electromagnetic steel plates stacked, for example, affixed to a case not shown.

Motor generator MG2 also operates as a power generator generating an electromotive force across three-phase coil 139 by the interaction between the magnetic field by the permanent magnets and the rotation of rotor 137. Further, motor generator MG2 operates as an electric motor that rotatably drives rotor 137 by the interaction between the magnetic field caused by the permanent magnet and the magnetic field established by three-phase coil 139.

Reduction gear RD effects deceleration based on a configuration in which planetary carrier 166 that is one rotation element of the planetary gear is fixed to the case. Specifically, reduction gear RD includes a sun gear 162 coupled to an output shaft 160 of rotor 137, a ring gear 168 rotating integrally with ring gear 152, and a pinion gear 164 engaging with ring gear 168 and sun gear 162 to transmit the rotation of sun gear 162 to ring gear 168. For example, by setting the number of teeth of ring gear 168 at least two times that of sun gear 162, the speed reduction ratio can be set to two or greater.

The rotation of motor generator MG2 is transmitted to output member (ring gear case) 155 rotating integrally with ring gears 152 and 168 via reduction gear RD. Specifically, motor generator MG2 is configured to apply mechanical power in a path from output member 155 to the driving wheel. It is to be noted that connection between output shaft 160 of motor generator MG2 and output member 155 may be established without disposing reduction gear RD, i.e. without providing a reduction ratio.

Power conversion unit 20 includes a boost converter 12, and inverters 14 and 22. Boost converter 12 converts the DC voltage from battery 10 for output between a power supply line PL and a ground line GL. Boost converter 12 is configured to allow voltage conversion bidirectionally, and converts the DC voltage between power supply line PL and ground line GL into the charging voltage for battery 10.

Inverters 14 and 22 convert the DC voltage between power supply line PL and ground line GL into AC voltage for output to motor generators MG2 and MG1, respectively. Further, inverters 14 and 22 convert the AC voltage generated by motor generators MG2 and MG1 into DC voltage for output between power supply line PL and ground line GL.

(Control Configuration of Motor Generator)

A control configuration of motor generators MG1 and MG2 will be described hereinafter.

Figure 3:
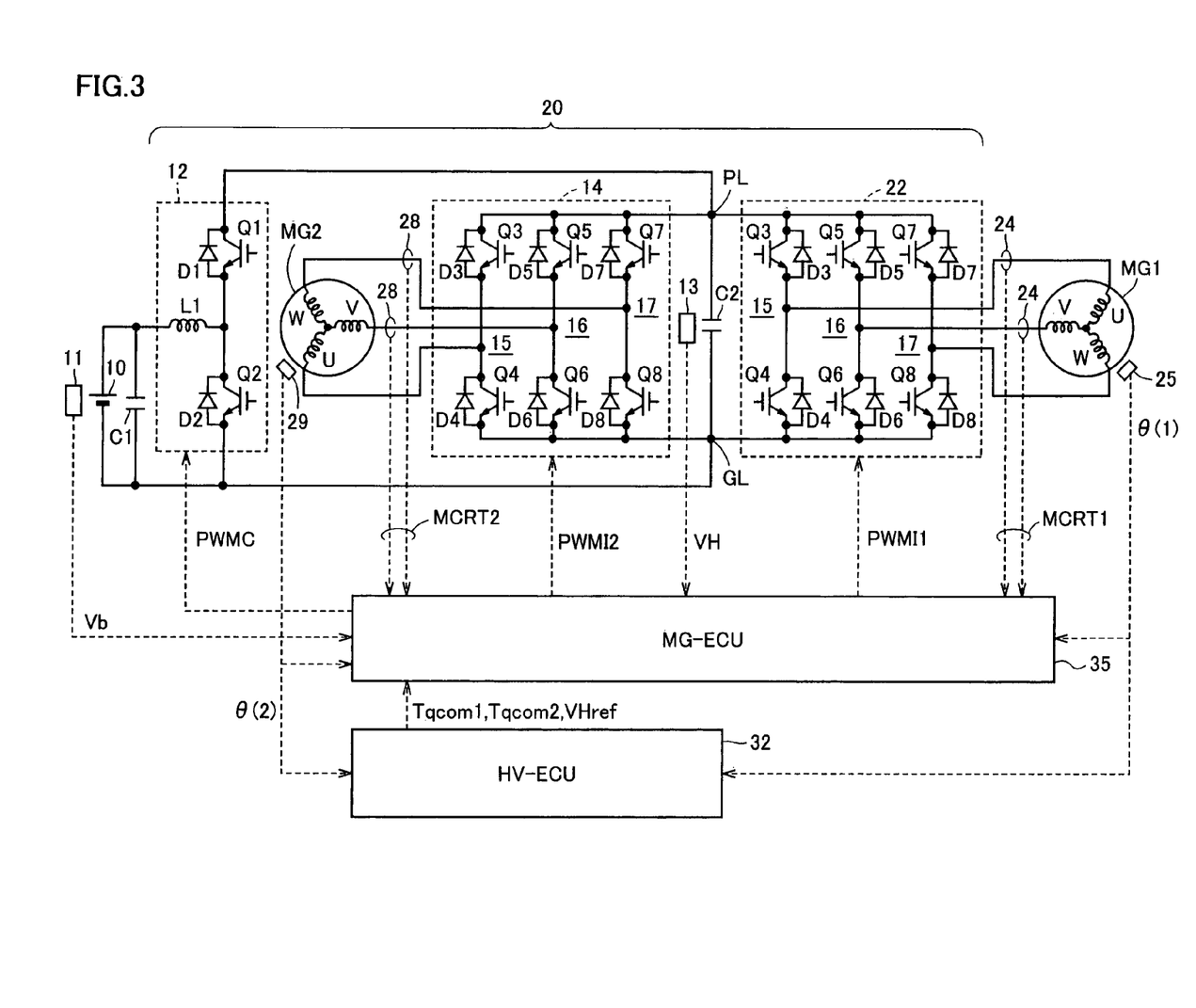
FIG. 3 is a schematic block diagram representing a control configuration of a motor generator.

FIG. 3 is a schematic block diagram representing a control configuration of motor generators MG1 and MG2.

Referring to FIG. 3, power conversion unit 20 includes capacitors C1 and C2, a boost converter 12, inverters 14 and 22, and current sensors 24 and 28.

ECU 30 shown in FIG. 2 includes an HV-ECU 32 generating torque command values Tqcom1 and Tqcom2 that are operation command values of motor generators MG1 and MG2, and a voltage command value VHref that is an operation command value of boost converter 12, and an MG-ECU 35 controlling boost converter 12 and inverters 14 and 22 such that an output voltage VH of boost converter 12 follows voltage command value VHref, and the output torques of motor generators MG1 and MG2 follow torque command values Tqcom1 and Tqcom2.

Boost converter 12 includes a reactor L1, IGBT (Insulated Gate Bipolar Transistor) elements Q1 and Q2, and diodes D1 and D2. Reactor L1 has one end connected to the power supply line of battery 10 and the other end connected to an intermediate point between IGBT element Q1 and IGBT element Q2, i.e. between the emitter of IGBT element Q1 and the collector of IGBT element Q2. IGBT elements Q1 and Q2 are connected in series between the power supply line and the earth line. The collector of IGBT element Q1 is connected to the power supply line, and the emitter of IGBT element Q2 is connected to the earth line. Further, diodes D1 and D2 conducting a current flow from the emitter side towards the collector side are provided between the collector and emitter of IGBT elements Q1 and Q2, respectively.

Inverter 14 includes U-phase upper and lower arms 15, V-phase upper and lower arms 16, and W-phase upper and lower arms 17. U-phase upper and lower arms 15, V-phase upper and lower arms 16, and W-phase upper and lower arms 17 are arranged in parallel between the power supply line and the earth line. U-phase upper and lower arms 15 are formed of IGBT elements Q3 and Q4 connected in series. V-phase upper and lower arms 16 are formed of IGBT elements Q5 and Q6 connected in series. W-phase upper and lower arms 17 are formed of IGBT elements Q7 and Q8 connected in series. Further, diodes D3-D8 conducting a current flow from the emitter side to the collector side are connected between the collector and emitter of IGBT elements Q3-Q8, respectively.

The intermediate point of the upper and lower arms of each phase is connected to each phase end of each phase coil of motor generator MG2. Specifically, the three coils of the U, V, and W-phase have one end connected in common to the intermediate point. In addition, the U-phase coil has the other end connected to the intermediate point of IGBT elements Q3 and Q4. The V-phase coil has the other end connected to the intermediate point of IGBT elements Q5 and Q6. The W-phase coil has the other end connected to the intermediate point of IGBT elements Q7 and Q8.

Inverter 22 has a configuration identical to that of inverter 14.

Voltage sensor 11 detects DC voltage Vb output from battery 10, and provides the detected DC voltage Vb to MG-ECU 35. Capacitor C1 smoothes DC voltage Vb supplied from battery 10, and provides the smoothed DC voltage Vb to boost converter 12.

Boost converter 12 boosts DC voltage Vb from capacitor C1 and provides the boosted voltage to capacitor C2. Specifically, in response to receiving a signal PWMC from MG-ECU 35, boost converter 12 boosts DC voltage Vb for supply to capacitor C2 according to the ON period of IGBT element Q2 by signal PWMC.

Further, boost converter 12 responds to reception of signal PWMC from MG-ECU 35 to down-convert the DC voltage supplied from inverter 14 and/or inverter 22 via capacitor C2 to charge battery 10.

Capacitor C2 smoothes the DC voltage from boost converter 12 and provides the smoothed DC voltage to inverters 14 and 22 via power supply line PL and ground line GL. Voltage sensor 13 detects the voltage across capacitor C2, i.e. output voltage VH of boost converter 12 (corresponding to the input voltage to inverters 14 and 22; the same applies hereinafter), and provides the detected output voltage VH to MG-ECU 35.

When DC voltage is supplied from capacitor C2, inverter 14 converts the DC voltage into AC voltage to drive motor generator MG2 based on a signal PWMI2 from MG-ECU 35. Accordingly, motor generator MG2 is driven to generate torque specified by torque command value Tqcom2.

Further, in a regenerative braking mode of hybrid vehicle 5, inverter 14 converts the AC voltage generated by motor generator MG2 into DC voltage based on a signal PWMI2 from MG-ECU 35 and provides the converted DC voltage to boost converter 12 via capacitor C2. As used herein, "regenerative braking" includes braking in association with regeneration when the driver of the hybrid vehicle operates the foot brake as well as reducing the vehicle speed (or ceasing acceleration) while effecting regeneration by rendering the accelerator pedal off during running without operating the foot brake.

When DC voltage is supplied from capacitor C2, inverter 22 converts the DC voltage into AC voltage to drive motor generator MG1 based on a signal PWMI1 from MG-ECU 35. Accordingly, motor generator MG1 is driven to generate the torque specified by torque command value Tqcom1.

Current sensor 24 detects motor current MCRT1 flowing to motor generator MG1 and provides the detected motor current MCRT1 to MG-ECU 35. Current sensor 28 detects motor current MCRT2 flowing to motor generator MG2, and provides the detected motor current MCRT2 to MG-ECU 35.

Motor generators MG1 and MG2 have degree of rotation sensors 25 and 29 for detecting the degree of rotation of the rotor. A rotor degree of rotation θ(1) of motor generator MG1 detected by degree of rotation sensor 25 and a rotor degree of rotation θ(2) of motor generator MG2 detected by degree of rotation sensor 29 are transmitted to MG-ECU 35 and HV-ECU 32.

MG-ECU 35 receives from voltage sensor 11 DC voltage Vb output from battery 10, motor currents MCRT1 and MCRT2 from current sensors 24 and 28, respectively, the output voltage VH of boost converter 12 (that is, the input voltage to inverters 14 and 22) from voltage sensor 13, and rotor degree of rotations θ(1) and θ(2) from degree of rotation sensors 25 and 29, respectively. MG-ECU 35 also receives a voltage command value VHref and torque command values Tqcom1 and Tqcom2, which are operation command values, from HV-ECU 32. It is to be noted that MG1 revolution speed Nm1 (rpm) and MG2 revolution speed Nm2 (rpm) can be obtained based on rotor degree of rotations θ(1) and θ(2).

Then, based on output voltage VH, motor current MCRT2, and torque command value Tqcom2, MG-ECU 35 generates and provides to inverter 14 a signal PWMI2 for switching-control of IGBT elements Q3-Q8 of inverter 14 when inverter 14 drives motor generator MG2 by a method that will be described afterwards. Further, based on output voltage VH, motor current MCRT1 and torque command value Tqcom1, MG-ECU 35 generates and provides to inverter 22 a signal PWMI1 for switching-control of the IGBT elements of inverter 22 when inverter 22 drives motor generator MG1 by a method that will be described afterwards.

Moreover, based on voltage command value VHref and at least DC voltage Vb and output voltage VH, MG-ECU 35 generates and provides to boost converter 12 a signal PWMC for switching-control of IGBT elements Q1 and Q2 of boost converter 12.

Figure 4:
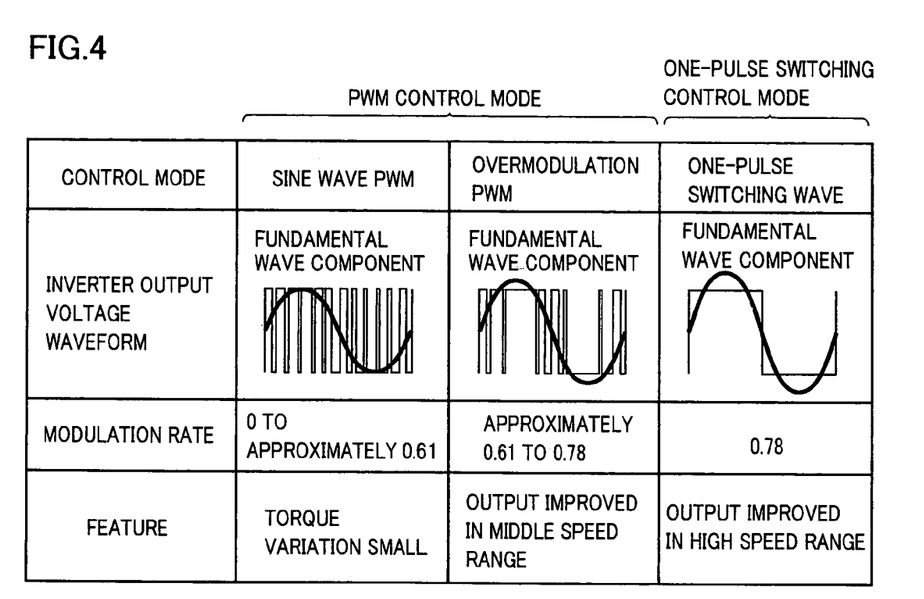
FIG. 4 schematically represents the control modes for each motor generator.

FIG. 4 is a diagram to schematically describe the control modes of each motor generator.

As shown in FIG. 4, the present embodiment switches among three control modes for usage in the control of motor generators MG1 and MG2, i.e. the power conversion at inverters 14 and 22.

Sine wave PWM control is employed as the general PWM control. The upper and lower arm elements of each phase are turned on/off according to voltage comparison between the sinusoidal wave voltage command value and the carrier wave (typically, a triangular wave). For the group of the high-level period corresponding to an ON period of the upper arm element and the low-level period corresponding to the ON period of the lower arm element, the duty ratio is controlled such that the fundamental wave component matches a sine wave within the electrical angle period of 360°. It is well known that the fundamental wave component amplitude can only be increased to approximately 0.61 times the inverter input voltage in a sine wave PWM control mode.

In one-pulse switching control mode, a one-pulse switching wave with 1:1 as the ratio of the high-level period to the low-level period is applied to the AC electric motor during the electrical angle period of 360°. Accordingly, the modulation rate is improved up to 0.78.

Overmodulation PWM control mode corresponds to PWM control similar to the sine wave PWM control set forth above with the amplitude of the voltage command value distorted. As a result, the fundamental wave component can be distorted, allowing the modulation rate to be improved from the highest modulation rate (approximately 0.61) in the sine wave PWM control mode up to as high as 0.78.

Since the induced voltage becomes higher when the revolution speed or output torque is increased in motor generators MG1 and MG2, the required line voltage (motor required voltage) becomes higher. The output voltage VH from boost converter 12 must be set higher than this motor required voltage. However, output voltage VH of boost converter 12 has a restricted value (VH maximum voltage).

In the region where the motor required voltage is lower than VH maximum voltage, a PWM control mode by sine wave PWM control or overmodulation PWM control is applied such that the output torque is regulated to torque command values Tqcom1 and Tqcom2 by feedback control of the motor current according to vector control. When the motor required voltage arrives at the level of VH maximum voltage, a one-pulse switching control mode is applied with output voltage VH set at the level of VH maximum voltage. In the one-pulse switching control, the amplitude of the fundamental wave component is fixed. Therefore, torque control is executed by phase control of the one-pulse switching wave voltage based on the deviation between the actual torque value and the torque command value.

(MG1 Overspeed Protection and Power Balance Control of Present Embodiment)

Figure 5A:
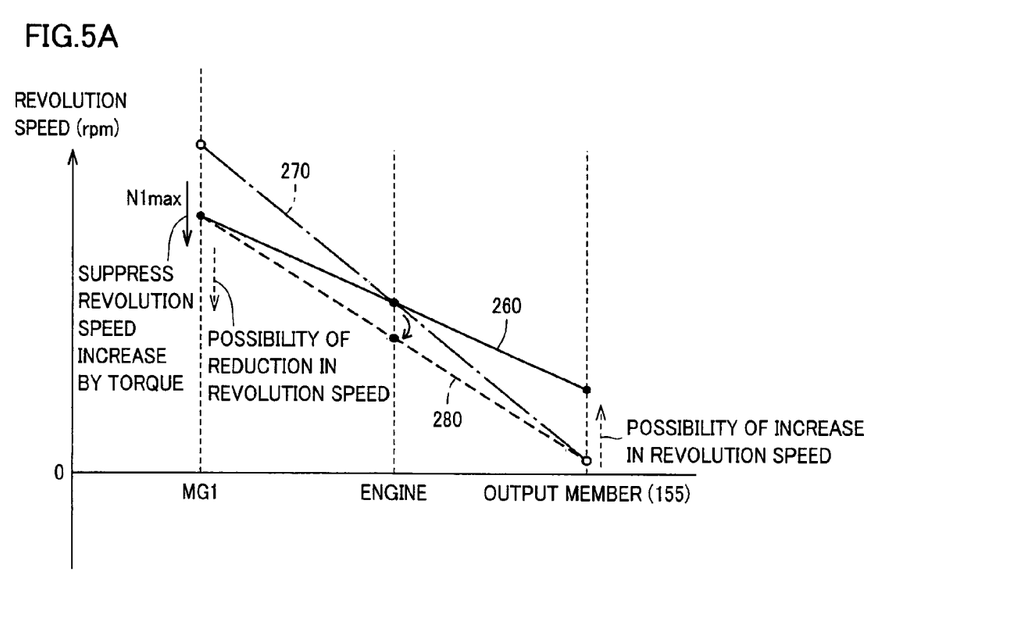
FIGS. 5A and 5B are a nomographic chart and an operation waveform diagram, respectively, for describing MG1 overrun protection control and problems thereof in a hybrid vehicle.

In a hybrid vehicle configured as set forth above, the revolution speed of motor generator MG1, the speed of engine ENG, and the revolution speed of the output member (ring gear case) 155 are respectively modified such that the difference in the speed of motor generator MG1 and engine ENG with respect to output member 155 maintains a constant ratio by the differential operation of power split device PSD, as shown in the nomographic chart of FIG. 5A.

Therefore, the change in the revolution speed of any of the elements will affect the revolution speed of another element. Particularly in a hybrid vehicle incorporating a high power engine of great inertia, there is the possibility of the MG1 revolution speed rapidly falling upon influence of reduction in the engine speed during MG1 overrun protection control that is executed when motor generator MG1 rotates at high-speed.

Figure 5B:
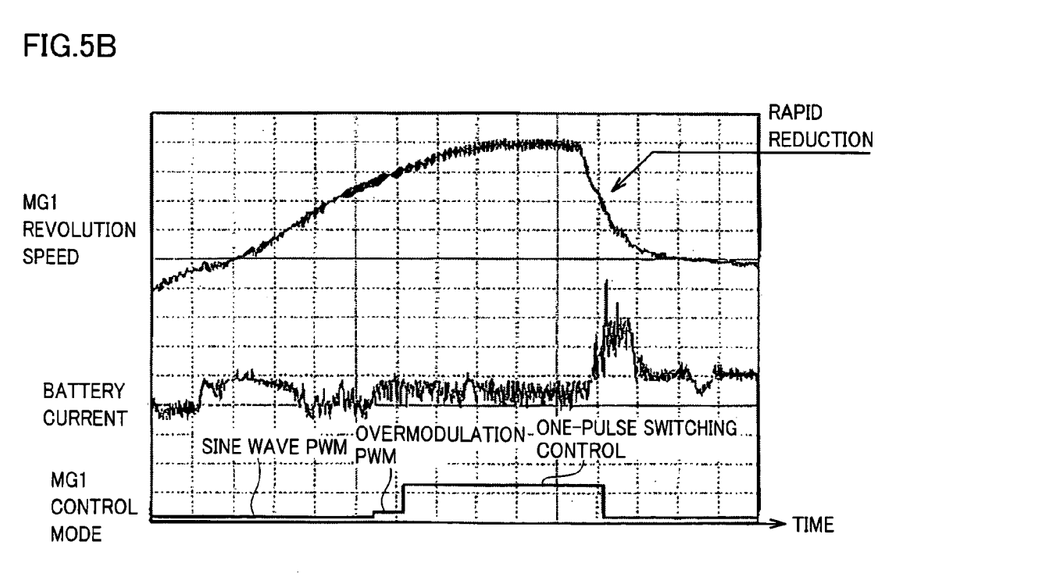

FIGS. 5A and 5B are directed to representing MG1 overrun protection control and problem thereof. FIG. 5A is a nomographic chart to describe the aforementioned problem. FIG. 5B represents an example of an operation waveform during occurrence of the aforementioned problem.

Referring to FIG. 5A, the revolution speed of motor generator MG1 (hereinafter, also simply referred to as MG1 revolution speed) is controlled such that the engine speed corresponds to a region of favorable fuel consumption with respect to the revolution speed of output member 155 that is determined corresponding to the car speed in a normal running mode.

The powertrain of hybrid vehicle 5 has the power balance established such that the sum of the total electrical power of each of motor generators MG1 and MG2 (power consumption indicated by positive value and generated electrical power indicated by negative value), the power loss at each site, and the input/output power of battery 10 (discharged power indicated by positive value and charged power indicated by negative value) becomes 0. Therefore, by restricting the operation of first and second motor generators (output torque and the like) such that the total electrical power of motor generators MG1 and MG2 is within a predetermined range, power balance control to prevent the occurrence of overcharging/overdischarging of the power supply device, and overcurrent at power conversion unit 20 is executed by HV-ECU 32 (FIG. 3), for example.

When hybrid vehicle 5 is decelerated by a brake pedal operation or the like in the case where the MG1 revolution speed approaches the control upper limit value N1max, as shown by line 260 in the nomographic chart, there is the possibility that reduction in the revolution speed of output member 155 corresponding to the lowered vehicle speed may cause the MG1 revolution speed to exceed the control upper limit value N1max to rise up to a region where component protection will be impaired.

In order to prevent such MG1 overrun, motor generator MG1 provides a large torque output so as to suppress increase of the MG1 revolution speed, and also reduces the engine output torque by engine control such as by fuel cut or the like to reduce the engine speed for the overall reduction in the revolution speed, as shown by line 280 in the nomographic chart. Thus, MG1 overrun protection control for reducing the MG1 revolution speed is executed. Since the electrical power generated by motor generator MG1 increases even under such a state, the aforementioned power balance control is carried out by increasing the power consumption at motor generator MG2, as necessary.

However, in the case where the engine inertia is high such as in the case of a high output engine, reduction in the engine speed through the MG1 overrun protection control for the transition from line 270 to line 280 in the nomographic chart may cause rapid reduction in the MG1 revolution speed according to the engine inertia working in the direction of lowering the speed. Moreover, since motor generator MG1 generates higher output torque in the direction of reducing the MG1 revolution speed in proportion to a higher engine output and higher torque, rapid reduction in the MG1 revolution speed will occur more readily if the influence of engine control is great as set forth above.

As a result, there is the possibility of rapid reduction in the electrical power generated by motor generator MG1, leading to disturbing the power balance. Furthermore, a rapid increase of the MG2 revolution speed caused by the differential operation corresponding to the rapid reduction in the MG1 revolution speed will cause rapid increase of power consumption by motor generator MG2, leading to the possibility of further disturbing the power balance. FIG. 5B represents the operation waveform under such circumstances.

Referring to FIG. 5B, increase in the MG1 revolution speed causes the MG1 control mode to be modified from the sine wave PWM control towards the overmodulation PWM and one-pulse switching control. In response to the rapid decrease in the MG1 revolution speed from the high rotation region where the one-pulse switching control is applied, it is appreciated that the aforementioned disturbance in the power balance will lead to rapid increase in the battery current that is the input/output current of battery 10.

In a hybrid vehicle according to an embodiment of the present invention, disturbance in the power balance triggered by a rapid reduction in the MG1 revolution speed during overrun protection control with lowering engine output torque may cause rapid increase of the output current from battery 10, leading to the possibility of overdischarging at battery 10 or overcurrent at power conversion unit 20.

In this context, the control apparatus of a hybrid vehicle according to an embodiment of the present invention is directed to preventing disturbance in the power balance by executing power balance control set forth below during MG1 overrun protection control.

Figure 6:
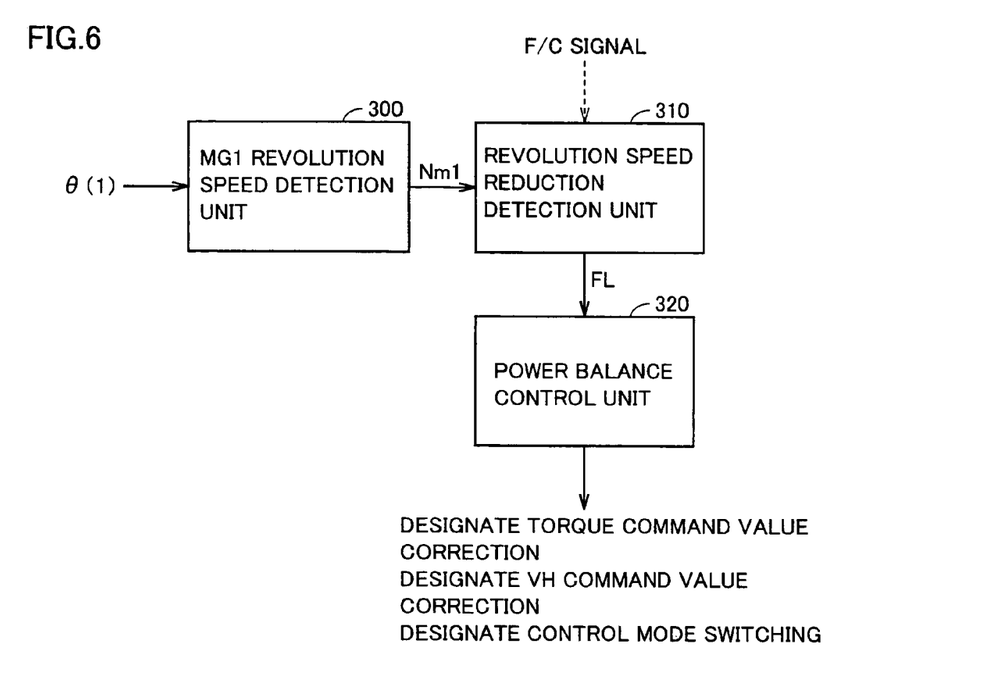
FIG. 6 is a schematic block diagram to describe a power balance control configuration during MG1 overrun protection control by the control apparatus for a hybrid vehicle according to an embodiment of the present invention.

FIG. 6 is a schematic block diagram for describing a power balance control configuration in a MG1 overrun protection control mode by a control apparatus for a hybrid vehicle according to an embodiment of the present invention. The function of each block in FIG. 6 is implemented by the execution of processing in hardware or software through HV-ECU 32.

Referring to FIG. 6, MG1 revolution speed detection unit 300 detects MG1 revolution speed Nm1(rpm) based on rotor degree of rotation θ(1) output from degree of rotation sensor 25. It is to be noted that rotor degree of rotation θ(1) may be estimated based on the motor current, voltage, and the like, in which case degree of rotation sensor 25 may be dispensed with. Revolution speed reduction detection unit 310 turns on a detection flag FL when MG1 revolution speed Nm1 is rapidly reduced according to reduction in the output torque of engine ENG, based on MG1 revolution speed Nm1 detected by MG1 revolution speed detection unit 300 and an engine control signal (typically, F/C signal designating fuel cut control).

Detection flag FL is turned on when MG1 revolution speed Nm1 is reduced by more than a predetermined value within a predetermined unit time, i.e. MG1 revolution speed is lowered by more than a predetermined speed reduction rate. The signal sensing reduction in the output torque of engine ENG is not limited to the F/C signal. Another control signal employed in engine control may be employed.

When detection flag FL is ON, power balance control unit 320 executes at least one of: correcting the torque command value of motor generator MG1 and/or MG2; correcting voltage command value VHref of boost converter 12, and designating control mode switching of motor generator MG1.

Figure 7:
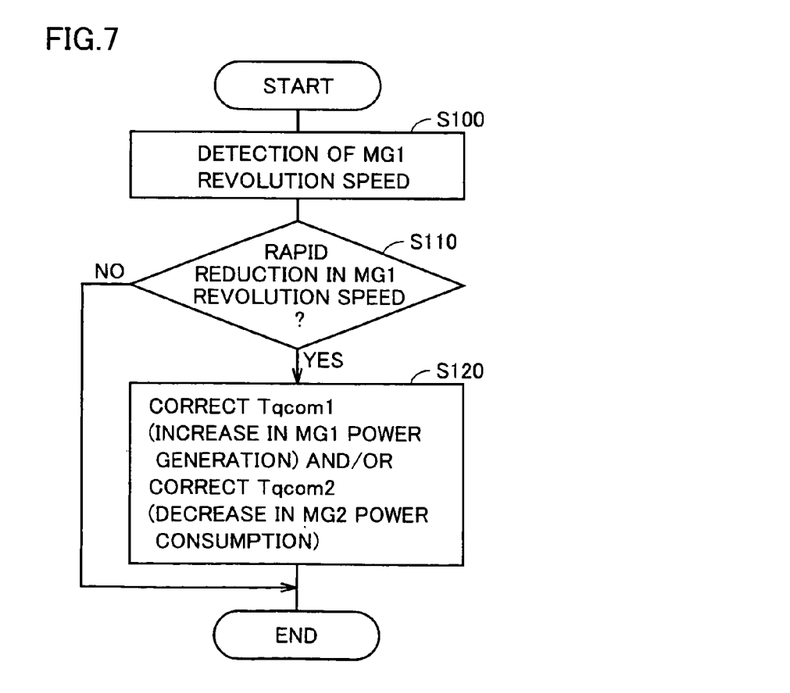
FIG. 7 is a flowchart representing a first example of power balance control when the MG1 revolution speed is reduced according to the present embodiment.

FIG. 7 is a flowchart representing a first example of power balance control when the MG1 revolution speed is reduced according to the present embodiment.

Referring to FIG. 7, HV-ECU 32 detects MG1 revolution speed Nm1 based on the output from degree of rotation sensor 25 at step S100. Namely, the operation of step S100 corresponds to the function of MG1 revolution speed detection unit 300 of FIG. 6.

In addition, HV-ECU 32 determines whether rapid reduction in MG1 revolution speed Nm1 in accordance with reduction in the output torque from engine ENG is occurring or not at step S110. Namely, the process of step S110 corresponds to the function of revolution speed reduction detection unit 310 of FIG. 6.

When the revolution speed of MG1 is rapidly dropping (YES determination at step S110), i.e. when detection flag FL is ON, HV-ECU 32 corrects torque command value Tqcom1 of MG1 in the direction of increasing the electrical power generated by motor generator MG1 at step S120. HV-ECU 32 also corrects torque command value Tqcom2 in the direction of reducing power consumption at motor generator MG2. Alternatively, HV-ECU 32 executes correction of both torque command value Tqcom1 and torque command value Tqcom2 set forth above at step S120. Namely, the operation of step S100 corresponds to the function of power balance control unit 320 of FIG. 6.

Accordingly, rapid increase in the total electrical power of motor generators MG1 and MG2 (change towards the direction of power consumption) can be suppressed. Thus, disturbance in the power balance can be alleviated even in the case where the MG2 revolution speed is rapidly decreased reflecting reduction in the output torque of the engine. This prevents overdischarging of battery 10 or overcurrent at power conversion unit 20 that is caused by rapid increase in the output current from battery 10.

Figure 8:
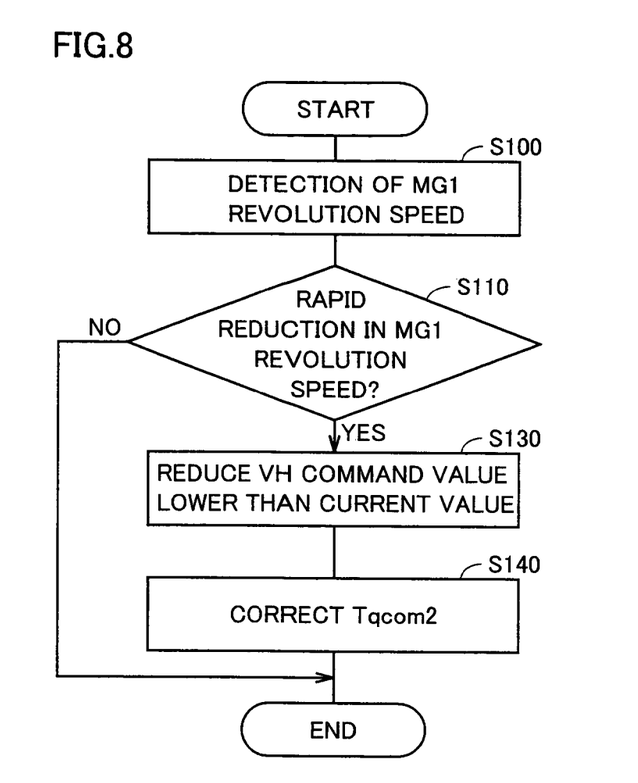
FIG. 8 is a flowchart representing a second example of power balance control when the MG1 revolution speed is reduced according to the present embodiment.

FIG. 8 is a flowchart representing a second example of power balance control when the MG1 revolution speed is reduced according to the present embodiment.

Referring to FIG. 8, HV-ECU 32 executes steps S100 and S110, likewise with those shown in FIG. 7. When the revolution speed of MG1 has rapidly being reduced (YES determination at S110), voltage command value VHref of boost converter 12 is set lower than the current value at step S130.

Accordingly, the output voltage VH of boost converter 12, i.e. the amplitude of the applied voltage to motor generators MG1 and MG2 is reduced, allowing the energy involved in motor generators MG1 and MG2 to be reduced proportionally. As a result, output current Ib from battery 10 can be reduced rapidly. Thus, overdischarging at battery 10 or overcurrent at power conversion unit 20 can be prevented.

Then, at step S140, HV-ECU 32 corrects torque command value Tqcom2 of motor generator MG2 corresponding to reduction in the inverter input voltage VH at step S130.

Figure 9:
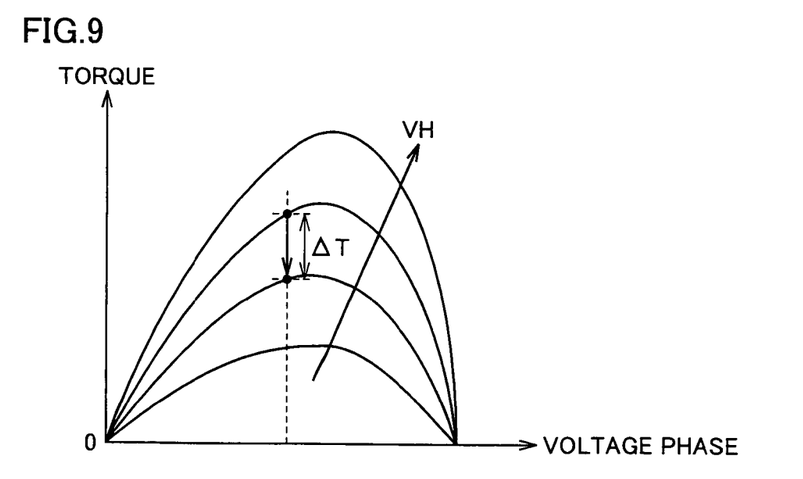
FIG. 9 is a schematic diagram representing the output torque control property of the motor generator.

Further description is provided hereinafter with reference to the output torque control property of the motor generator shown in FIG. 9. Motor generator MG1 rotates at high speed, under control of a one-pulse switching control mode. The output torque of motor generator MG1 is modified according to the voltage phase of the applied voltage and the output voltage (inverter input voltage) VH of boost converter 12. Motor generator MG2 rotates at low to middle speed, operated under a PWM control mode. The output torque of motor generator MG2 can be regulated consistent with the torque command of HV-ECU 32 even if inverter input voltage VH changes.

Reduction in inverter input voltage VH will cause lower output torque of motor generator MG1 independent of control by inverter 22. For example, in FIG. 9, the output torque of motor generator MG1 is reduced by ΔT in accordance with inverter input voltage VH by the process at step S140. In response, the electrical power generated by motor generator MG1 will become lower by just ΔT×Nm1×(2π/60).

By correcting torque command value Tqcom2 of motor generator MG2 corresponding to the reduced amount of electrical power generated by motor generator MG1, power consumption by motor generator MG2 can be reduced according to reduction of output voltage VH of boost converter 12. The correcting amount of torque command value Tqcom2 can be calculated corresponding to the reduced amount of voltage command value VHref. For example, correcting amount ΔTq2 can be calculated according to equation (a) set forth below.

$$\Delta Tq2 = [(C2 \text{ capacitance}) \times VH \times (VH\text{ref rate of charge}) + \Delta T \times Nm1 \times (2\pi/60)]/[Nm2 \times (2\pi/60)] - Tqcom2 \quad (a)$$

Figure 10:
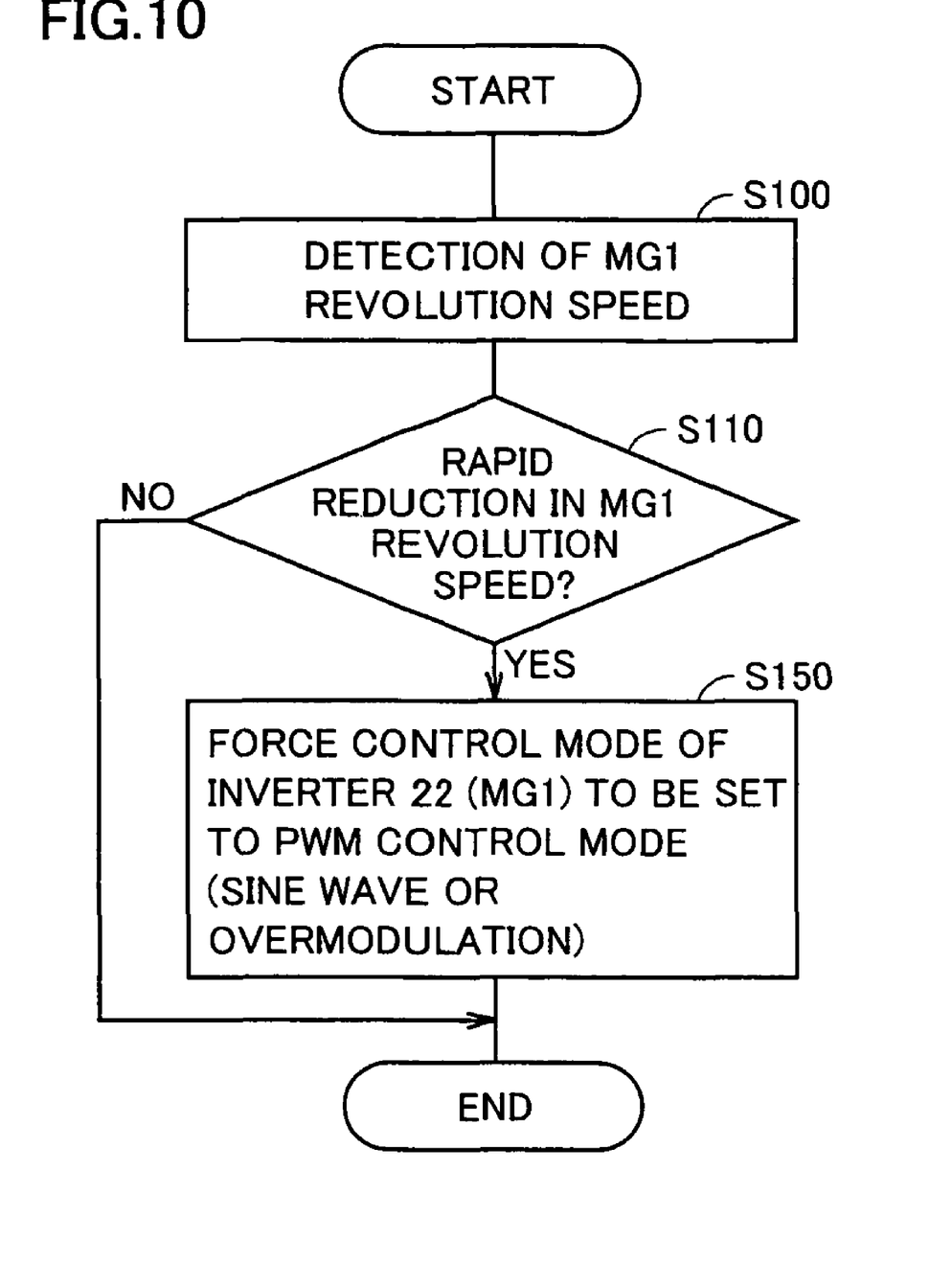
FIG. 10 is a flowchart representing a third example of power balance control when the MG1 revolution speed is reduced according to the present embodiment.

FIG. 10 is a flowchart representing a third example of power balance control when the MG1 revolution speed is reduced according to the present embodiment.

Referring to FIG. 10, HV-ECU 32 executes steps S100 and S110, likewise those shown in FIG. 7. When the revolution speed of MG1 has rapidly being reduced (YES determination at S110), the control mode of inverter 22 for controlling motor generator MG1 is forced to the PWM control mode.

It is appreciated from the nomographic chart of FIG. 5A that motor generator MG1 is at a high rotation region in the case where MG1 overrun protection control is executed. Therefore, in the event of a YES determination at step S110, motor generator MG1 takes the one-pulse switching control mode.

The one-pulse switching control mode is convenient for achieving high output at the high rotation region. However, it is to be noted that the amplitude of the applied voltage to the motor generator is fixed, and only the voltage phase can be controlled. Therefore, the control response is lower than that of the PWM control mode in which both the voltage amplitude and voltage phase can be controlled. Furthermore, in view of the event of rapid decrease in the MG1 revolution speed, no adverse effect will occur even if the control mode is immediately altered from the one-pulse switching control mode to the PWM control mode.

Therefore, in the case where rapid reduction of the MG1 revolution speed is detected, HV-ECU 32 switches the control mode of motor generator MG1 immediately to the PWM control mode in a feed-forward manner without waiting for the general control mode switching determination based on the feedback of the operation state of the motor generator (typically, voltage/current). Thus, a control mode of higher control response can be readily applied.

As a result, the event of delay in the control response causing increased reduction in the MG1 revolution speed to further reduce the electrical power generated by MG1, leading to great disturbance in the power balance, can be prevented. In other words, disturbance in the power balance triggered by the rapid reduction in the MG1 revolution speed due to control delay of motor generator MG1 can be alleviated, allowing occurrence of overdischarging at battery 10 or overcurrent at power conversion unit 20 to be prevented.

Figure 11A:
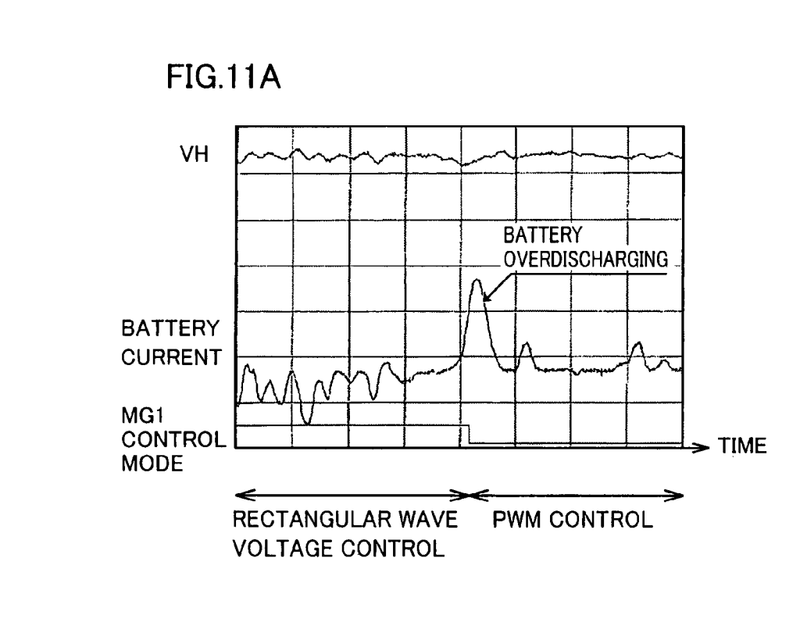
FIGS. 11A and 11B are waveform diagrams of the results of experiments representing an advantage according to the third example of power balance control when the MG1 revolution speed is reduced according to the present embodiment.
Figure 11B:
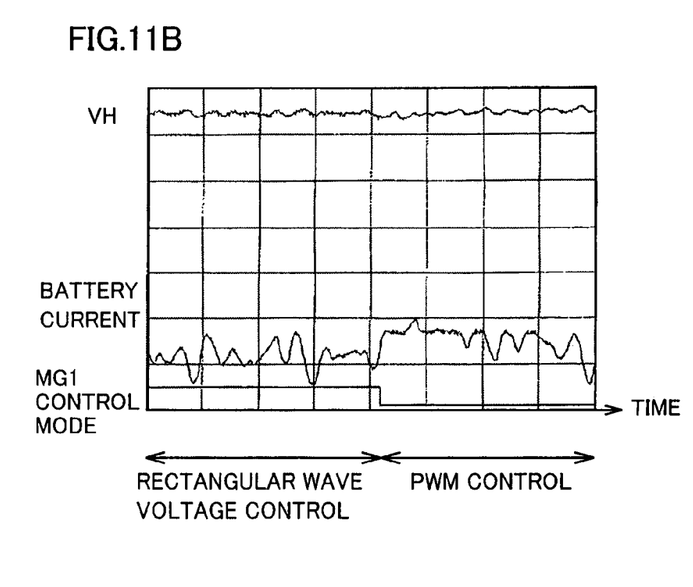

FIGS. 11A and 11B represent results of experiments representing the effect of power balance control according to the third embodiment shown in FIG. 10.

As shown in FIG. 11A, in the case where power balance control according to the third example is not applied, the battery current will rapidly increase by the disturbance in the power balance triggered by rapid reduction in the MG1 revolution speed during the change of the MG1 control mode from the high rotation state in which one-pulse switching control is applied to the PWM control mode according to the rapid reduction in the MG1 revolution speed. FIG. 11B represents the operation waveform when the MG1 revolution speed is rapidly reduced, likewise with the case of FIG. 11A, when the power control balance control of the third example is applied. It is appreciated from FIG. 11B that the switching of the MG1 control mode to the PWM control mode in a feed-forward manner when the MG1 revolution speed is rapidly reduced will suppress disturbance in the power balance, avoiding the rapid increase of the battery current.

It should be understood that the embodiments disclosed herein are illustrative and non-restrictive in every respect. The scope of the present invention is defined by the appended claims, rather than the description above, and is intended to include any modification within the scope and meaning equivalent to the terms of the claims.

INDUSTRIAL APPLICABILITY

The present invention can be applied to a hybrid vehicle including an engine and a motor generator connected to the engine via a power split device.

The invention claimed is:

1. A control apparatus for a hybrid vehicle including an engine operating by fuel combustion, a power split device connecting, in a relatively rotatable manner with respect to each other, a plurality of rotation elements respectively coupled to an output shaft of said engine, to an output shaft of a first motor generator and to an output member, and providing at least a portion of an output from said engine to said output member in accordance with input and output of electrical power and mechanical power by said first motor generator, a second motor generator applying mechanical power in a path from said output member to a driving wheel, and a power conversion unit connected to a power storage device and said first and second generators to carry out power conversion bidirectionally, said control apparatus comprising:
   a revolution speed detection unit for detecting a revolution speed of said first motor generator,
   a revolution speed reduction detection unit for detecting reduction in the revolution speed of said first motor generator according to reduction in output torque from said engine, based on the detected revolution speed of said first motor generator and a control signal of said engine, and
   a power balance control unit for controlling said power conversion unit such that a sum of input and output electrical power of said first and second motor generators is restricted to be within a predetermined range when reduction in the revolution speed of said first motor generator is detected by said revolution speed reduction detection unit,
   said power balance control unit modifying a control command to said power conversion unit such that overdischarging of said power storage device caused by reduction in electrical power generated by said first motor generator does not occur when reduction in the revolution speed of said first motor generator is detected by said revolution speed reduction detection unit.

2. The control apparatus for a hybrid vehicle according to claim 1, wherein said power balance control unit modifies an absolute value of the output torque of said first motor generator such that electrical power generated by said first motor generator increases when reduction in the revolution speed of said first motor generator is detected by said revolution speed reduction detection unit.

3. The control apparatus for a hybrid vehicle according to claim 1, wherein said power balance control unit modifies an absolute value of output torque of said second motor generator such that power consumption by said second motor generator is reduced when reduction in the revolution speed of said first motor generator is detected by said revolution speed reduction detection unit.

4. The control apparatus for a hybrid vehicle according to claim 1, wherein
   said power storage device inputs and outputs DC voltage,
   said power conversion unit includes first and second inverters provided between said power storage device and said first and second motor generators, respectively,
   each of said first and second inverters has selectively applied a first control mode in which switching is controlled to apply one-pulse switching wave voltage to a corresponding motor generator of said first and second motor generators, and a second control mode in which applied voltage to said corresponding motor generator is controlled according to pulse width modulation control,
   said power balance control unit forces the control mode of said first motor generator to be changed to said second control mode when reduction in the revolution speed of said first motor generator is detected by said revolution speed reduction detection unit.

5. The control apparatus for a hybrid vehicle according to claim 1, wherein
   said power storage device inputs and outputs DC voltage,
   said power conversion unit includes
      a converter provided between said power storage device and a DC power supply line, and configured to be capable of boosting output voltage of said DC voltage and outputting the boosted voltage to be output to said DC power supply line, and
      first and second inverters connected between said DC power supply line and said first and second motor generators, respectively, to carry out power conversion bidirectionally,
   said power balance control unit reduces an output voltage command value onto said DC power supply line for said converter lower than a current value when reduction in the revolution speed of said first motor generator is detected by said revolution speed reduction detection unit.

6. The control apparatus for a hybrid vehicle according to claim 5, wherein said power balance control unit corrects a torque command value of said second motor generator, corresponding to a reduced amount of said output voltage command value, such that power consumption by said second motor generator is reduced corresponding to a reduced amount of electrical power generated by said first motor generator.

7. The control apparatus for a hybrid vehicle according to claim 1, wherein said power split device includes a planetary gear mechanism having a carrier coupled to an output shaft of said engine, a ring gear coupled to said output member, and a sun gear coupled to an output shaft of said first motor generator, as said plurality of rotation elements.

8. A control method for a hybrid vehicle including an engine operating by fuel combustion, a power split device connecting, in a relatively rotatable manner with respect to each other, a plurality of rotation elements respectively coupled to an output shaft of said engine, to an output shaft of a first motor generator and to an output member, and providing at least a portion of an output from said engine to said output member in accordance with input and output of electrical power and mechanical power by said first motor generator, a second motor generator applying mechanical power in a path from said output member to a driving wheel, and a power conversion unit connected to a power storage device and said first and second generators to carry out power conversion bidirectionally, said method comprising the steps of:
  detecting a revolution speed of said first motor generator,
  detecting reduction in the revolution speed of said first motor generator according to reduction in output torque of said engine based on the detected revolution speed of said first motor generator and a control signal of said engine, and
  controlling said power conversion unit such that a sum of input and output electrical power of said first and second motor generators is restricted to be within a predetermined range when reduction in the revolution speed of said first motor generator is detected at said step of detecting reduction in the revolution speed,
  said step of controlling includes the step of modifying a control command to said power conversion unit such that overdischarging of said power storage device caused by reduction in electrical power generated by said first motor generator does not occur when reduction in the revolution speed of the first motor generator is detected.

9. The control method for a hybrid vehicle according to claim 8, wherein said step of controlling includes the step of modifying an absolute value of output torque of said first motor generator such that electrical power generated by said first motor generator increases when reduction in the revolution speed of said first motor generator is detected at said step of detecting reduction in the revolution speed.

10. The control method for a hybrid vehicle according to claim 8, wherein said step of controlling includes the step of modifying an absolute value of output torque of said second motor generator such that power consumption by said second motor generator is reduced when reduction in the revolution speed of said first motor generator is detected at said step of detecting reduction in the revolution speed.

11. The control method for a hybrid vehicle according to claim 8, wherein
  said power storage device inputs and outputs DC voltage,
  said power conversion unit includes first and second inverters provided between said power storage device and said first and second motor generators, respectively,
  each of said first and second inverters has selectively applied a first control mode in which switching is controlled to apply one-pulse switching wave voltage to a corresponding motor generator of said first and second motor generators, and a second control mode in which applied voltage to said corresponding motor generator is controlled according to pulse width modulation control,
  said step of controlling includes the step of forcing the control mode of said first motor generator to be changed to said second control mode when reduction in the revolution speed of said first motor generator is detected at said step of detecting reduction in the revolution speed.

12. The control method for a hybrid vehicle according to claim 8, wherein
  said power storage device inputs and outputs DC voltage,
  said power conversion unit includes
    a converter provided between said power storage device and a DC power supply line, and configured to be capable of boosting output voltage of said DC voltage and outputting the boosted voltage to be output to said DC power supply line, and
    first and second inverters connected between said DC power supply line and said first and second motor generators, respectively, to carry out power conversion bidirectionally,
  said step of controlling includes the step of reducing an output voltage command value onto said DC power supply line for said converter lower than a current value when reduction in the revolution speed of said first motor generator is detected at said step of detecting reduction in the revolution speed.

13. The control method for a hybrid vehicle according to claim 12, further comprising the step of correcting a torque command value of said second motor generator, corresponding to a reduced amount of said output voltage command value at said step of controlling, such that power consumption by said second motor generator is reduced corresponding to a reduced amount of electrical power generated by said first motor generator.

14. The control method for a hybrid vehicle according to claim 8, wherein said power split device includes a planetary gear mechanism having a carrier coupled to an output shaft of said engine, a ring gear coupled to said output member, and a sun gear coupled to an output shaft of said first motor generator, as said plurality of rotation elements.

* * * * *